(12) United States Patent
Ribighini

(10) Patent No.: US 11,483,519 B2
(45) Date of Patent: Oct. 25, 2022

(54) SAFETY DEVICE FOR VEHICLES

(71) Applicant: Antonio Ribighini, Ancona (IT)

(72) Inventor: Antonio Ribighini, Ancona (IT)

( * ) Notice: Subject to any disclaimer, the term of this patent is extended or adjusted under 35 U.S.C. 154(b) by 0 days.

(21) Appl. No.: 16/845,488

(22) Filed: Apr. 10, 2020

(65) Prior Publication Data

US 2020/0329216 A1 Oct. 15, 2020

(30) Foreign Application Priority Data

Apr. 11, 2019 (IT) .......................... 102019000005598

(51) Int. Cl.
*H04N 7/18* (2006.01)
*H04N 5/232* (2006.01)

(52) U.S. Cl.
CPC ........... *H04N 7/18* (2013.01); *H04N 5/23296* (2013.01); *H04N 5/23299* (2018.08)

(58) Field of Classification Search
USPC ........................................................ 348/148
See application file for complete search history.

(56) References Cited

U.S. PATENT DOCUMENTS

| | | | |
|---|---|---|---|
| 8,044,776 B2 * | 10/2011 | Schofield | B60Q 3/258 340/425.5 |
| 2010/0171832 A1 | 7/2010 | Solida | |
| 2010/0201816 A1 | 8/2010 | Lee et al. | |
| 2011/0149077 A1 | 6/2011 | Robert | |
| 2018/0154831 A1 * | 6/2018 | Spencer | H04N 7/181 |

FOREIGN PATENT DOCUMENTS

JP   H0891158   4/1996

OTHER PUBLICATIONS

Search Report for IT 102019000005598 dated Sep. 23, 2019 (8 pages).

* cited by examiner

*Primary Examiner* — Mikhail Itskovich
(74) *Attorney, Agent, or Firm* — Tutunjian & Bitetto, P.C.

(57) ABSTRACT

Improved safety device for vehicles, including at least one video camera, with possible zoom and tilt function that can be installed in one or more portions of the external surface of a vehicle, oriented so that its lens is facing in the opposite direction to that of the vehicle, or in the same direction in case of reverse, during which the possible tilt and zoom function is activated; at least one processing unit, to which the camera is operatively connected, which sends images selectively and at the request of the driver to a display of the vehicle, operationally connected to the processing unit by means of wiring or wireless connections; a control, operationally connected to the processing unit, operable by the driver and able to selectively activate the camera, and therefore the rear view function on the display.

9 Claims, 9 Drawing Sheets

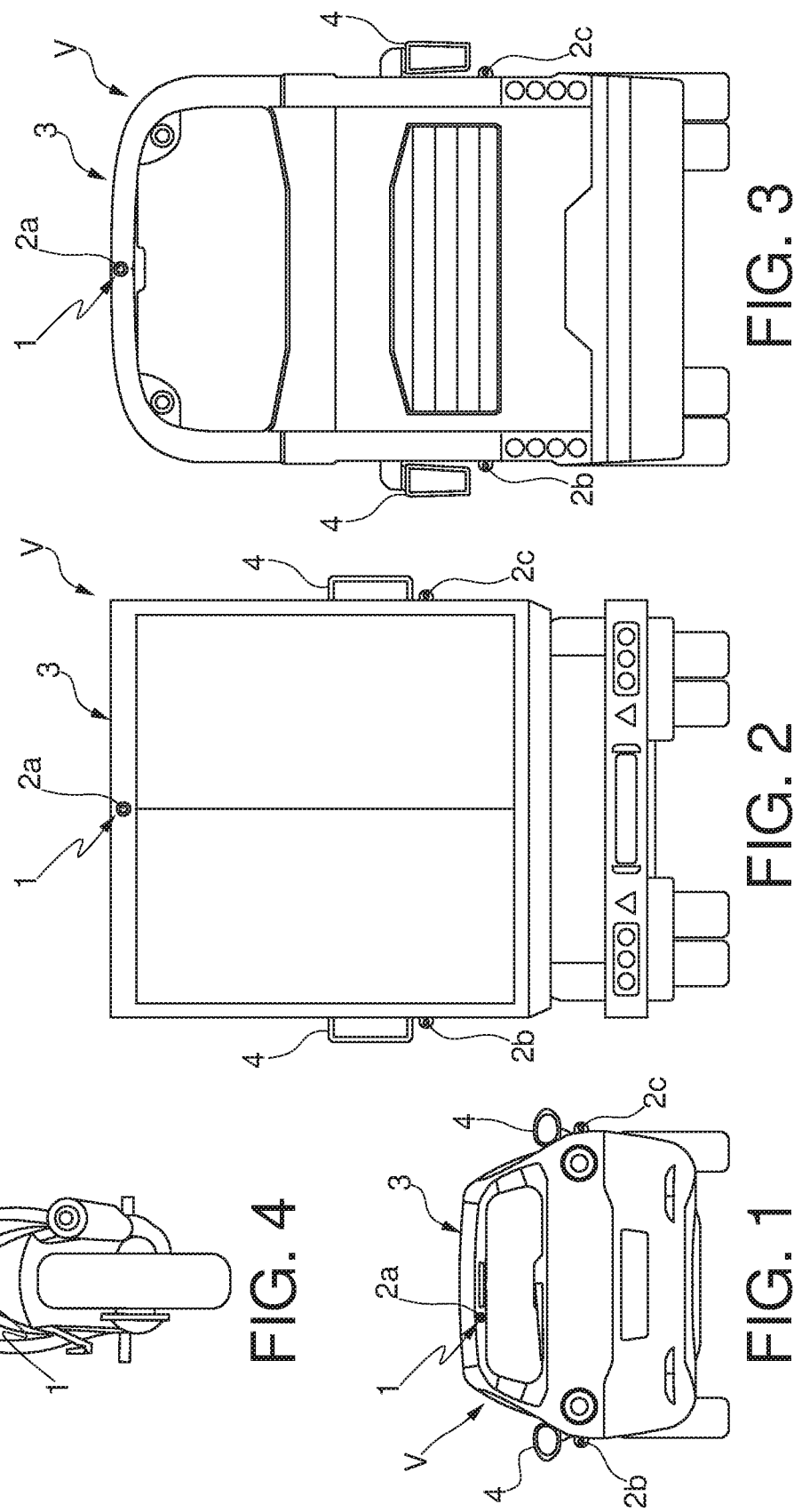

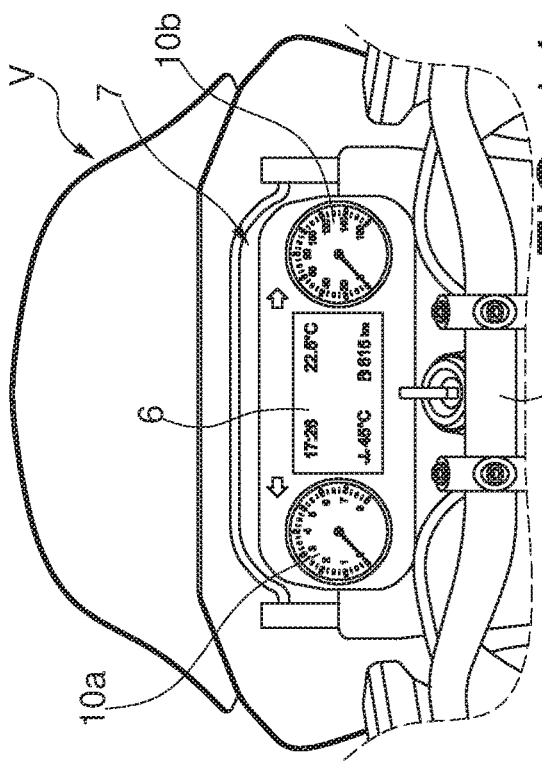
FIG. 14
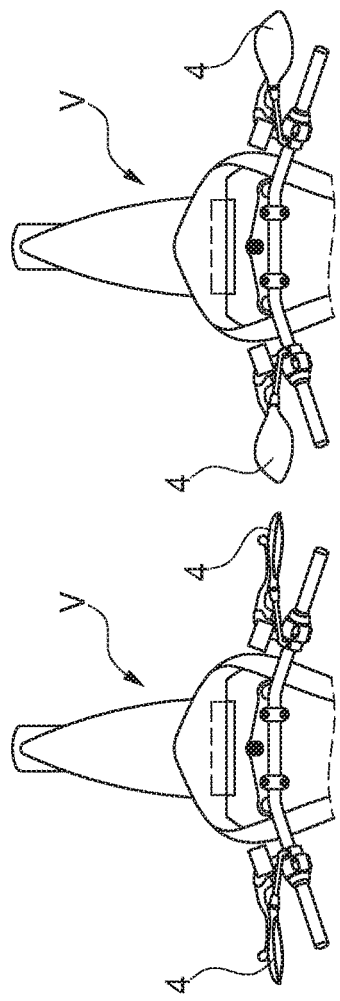
FIG. 16
FIG. 17
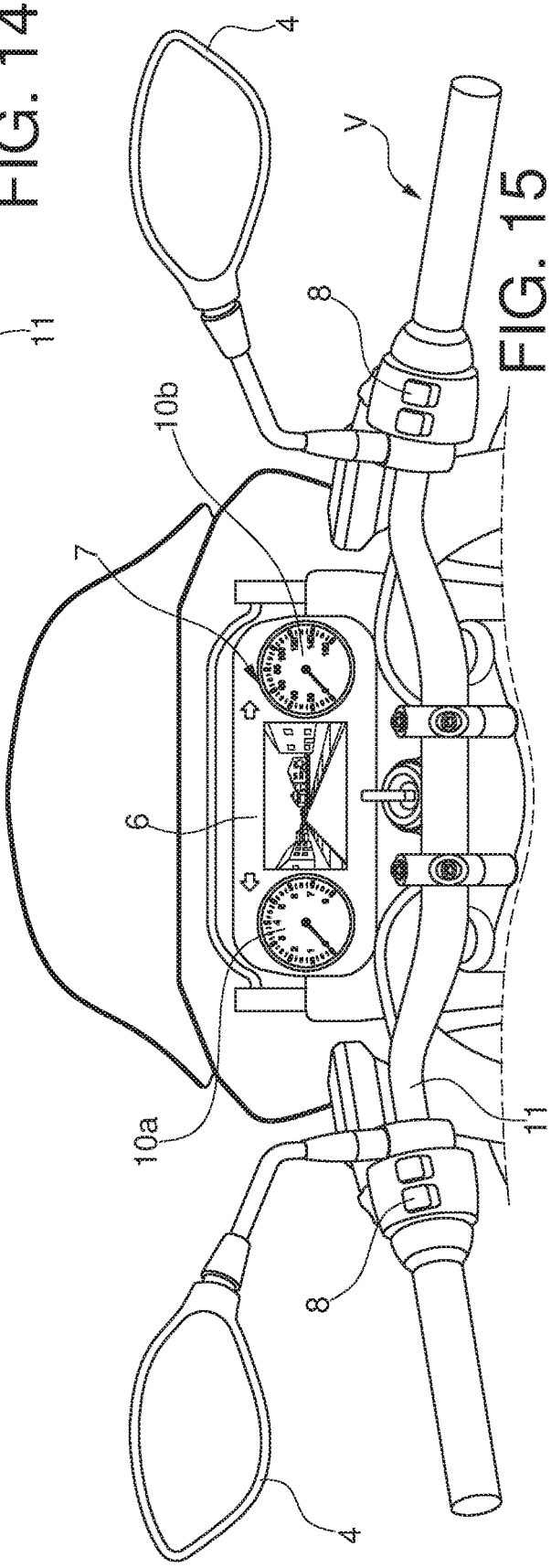
FIG. 15

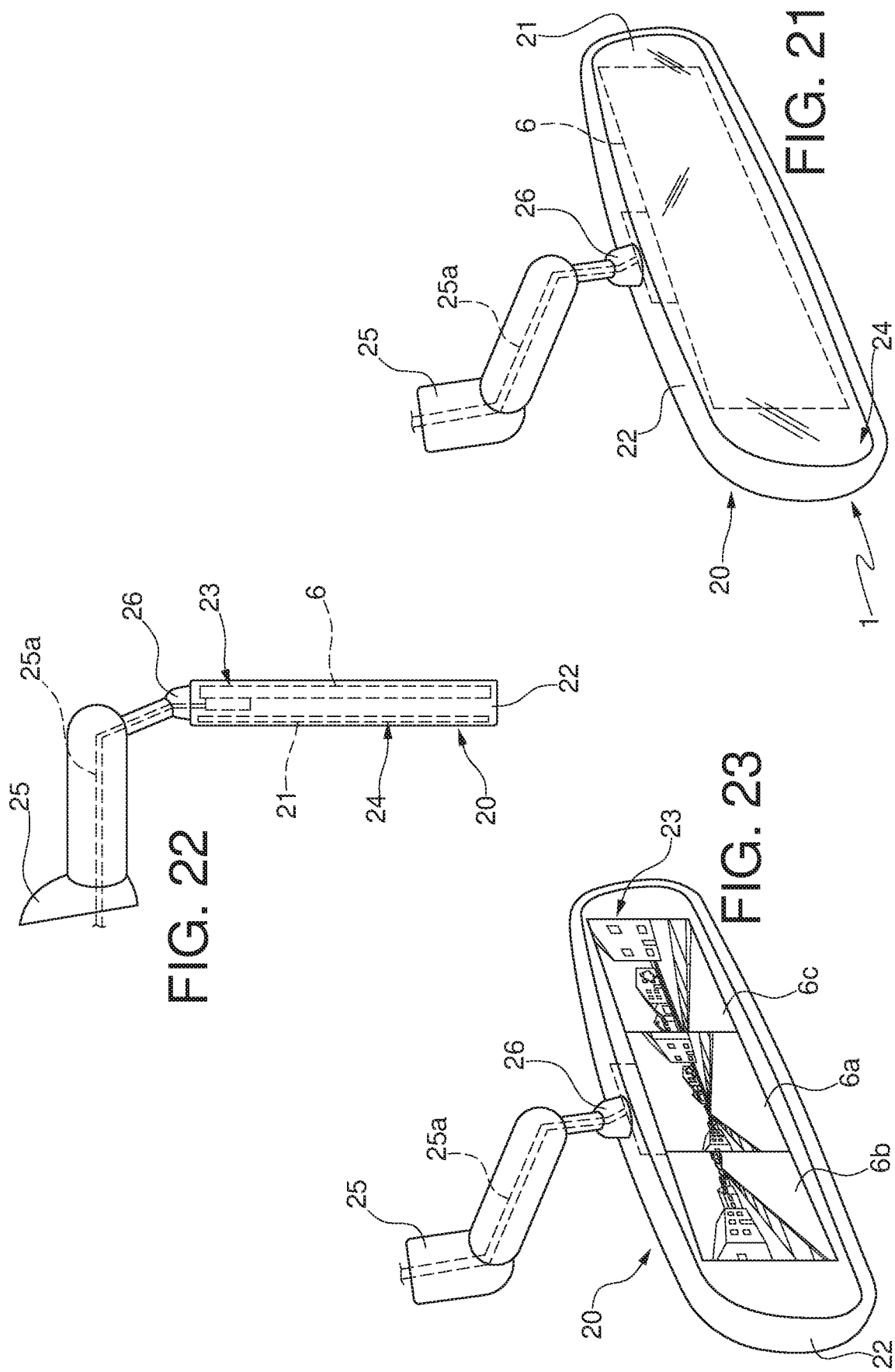

SAFETY DEVICE FOR VEHICLES

TECHNICAL FIELD OF THE INVENTION

The present invention concerns an improved safety device for vehicles.

More specifically, the present invention relates to improved devices for increasing the active safety of velocipedes, mopeds, motorcycles and all other types of vehicles, integrating the functions of the displays and rear-view mirrors currently supplied to vehicles in general.

Even more in detail, the present invention provides for the adoption of special devices to integrate the functions of the displays and rear-view mirrors to allow the driver to have a clear, complete and panoramic rear view, without blind corners and erroneous evaluation of the distances, while the vehicle moves forward, thus increasing the active safety of velocipedes, mopeds, motorcycles and all other types of vehicles in general.

In addition, in a version of the invention, the device allows cyclists not to have to take a hand off the handlebar to manage the information on the on-board computer, to the benefit of active safety.

BACKGROUND ART

Traveling on a road with a vehicle, of whatever type it is, it is extremely important, as far as traffic safety is concerned, to be able to see and control what is happening behind you and on both sides.

The need for rear vision when traveling with a vehicle is perceived from the beginning.

In fact, already in the first models of motorcycles and motor vehicles, in order to be able to see and control what happened behind, at least one rear-view mirror was provided on the handlebars of the motorcycles; the vehicles were instead equipped with a rear view mirror placed in the center of the dashboard or windscreen.

In more recent years, the need for a wider rear view has been made its own by the legislator, who has imposed the adoption of one or two rear-view mirrors in motorcycles; for motor vehicles, in addition to the central internal mirror, first an external mirror on the left side and then a further one on the right side were made mandatory.

Similar obligations have also been envisaged for other vehicles such as trucks, buses, couriers, caravans, etc. as proof of the importance for active driving safety, while the vehicle is moving forward, to be able to provide the driver with the clearest, most complete and most panoramic view.

To date, the rear view of vehicles, in particular velocipedes, motor vehicles, buses, trucks and caravans, is very poor and incomplete, or even absent.

In fact:
  velocipedes have no obligation of rear-view mirror(s), and cyclists therefore have no knowledge of what is happening behind them, while remaining exposed to the risks that this entails;
  motorcycles and mopeds are equipped with one or two small rear-view mirrors, which allow only partial rear vision without losing the central vision, which is the most important;
  buses, trucks, caravans, etc. have only two external rear-view mirrors, of great dimensions and sometimes double, which allow only a partial rear vision, losing the central vision, which is the most important;
  only for motor vehicles, the rear view is currently obtained with three rear view mirrors, the use of which, however, involves various limitations and problems.

More specifically, it is noted that the use of rear-view mirrors entails for the driver of a motor vehicle the following limitations and problems which, depending on the circumstances, are also common to drivers of other types of vehicles:
  the external mirrors, unlike the internal one, provide an incorrect assessment of the distances of the following vehicles;
  to have the rear view as complete as possible, it is necessary for the driver to look away from the direction of travel of the vehicle for a relatively long period of time, necessary to look first at the left external mirror, then at the central internal mirror and finally the external right one;
  the rear view, reflected by the interior mirror, is definitely limited by the uprights and the dimensions of the rear window, the headrests of the rear seats, the passengers and/or luggage covering the rear window.

Recently, to make safer only the movement in reverse, some vehicles often include, as an option, a video camera positioned in the rear part of the vehicle; the images taken by this camera are displayed on a display usually installed in the dashboard in a central position, also used for other functions, such as displaying radio information, DVD, external music sources and for viewing images and map data or the navigator and, more recently, a whole series of other information or data relating to the vehicle.

Typically, the camera activates automatically when the driver engages reverse gear; however, it doesn't work during normal forward travel.

Even more recently, in the car trade shows, some "concept cars" have put on display cameras with dedicated displays to replace the rear view mirrors; the innovation has been exposed only to cars, and is expensive and cumbersome, due to the presence of one or more additional displays above the dashboard which reduce, among other things, the front view; on the other hand, the solution to replace/eliminate the rear-view mirrors is not allowed by the current regulations of the individual countries, and is therefore unachievable.

As regards, in particular, the displays with which the various types of vehicles are currently equipped, the following is observed.

Traditional velocipeds, or muscle powered, are generally not equipped with displays, except, sometimes, a small display that can be installed as an accessory to view the information on the on-board computer (total and partial mileage, average, maximum and minimum speed, track of the path followed and to follow, date and time, cyclist's calorie consumption, heart rate, blood pressure, etc.).

This information appears sequentially by pressing one or more buttons, provided in the box element that also contains the display.

Velocipedes with pedal assistance usually have a display that permanently or sequentially displays the battery status, the level of pedal assistance required, information on the on-board computer, etc.

Motorcycles and mopeds, which no longer adopt traditional circular instruments (odometer and tachometer) are generally equipped with a display—usually generous in size—located in the center of the handlebar, which displays, in addition to engine speed and rpm, a set of additional information.

Motorcycles and mopeds that adopt traditional circular instruments, on the other hand, are generally equipped with a small display between the two circular instruments, which displays various information relating to the vehicle.

Passenger cars, bus caravans, trucks, road trains generally have at least two displays.

A first display is generally placed in front of the steering wheel; it displays—usually analogically—the vehicle speed, engine revolutions and other on-board computer information (instantaneous and average consumption, total or partial mileage, etc.); some of the data or information appear sequentially by pressing a special button provided on the steering wheel, or near the steering wheel.

In other cases, this smaller display is interposed between the two traditional circular instruments, and it displays information such as instantaneous and average consumption, total and partial mileage, etc.; also in these cases, some of the information appears sequentially by pressing a special button on the steering wheel or near the steering wheel.

A second display is placed in the central part of the dashboard, generally lower than the first.

Currently, this second display is used to alternately view:
information from the radio, or from the DVD, or from external music sources;
the images or information of the map or navigator;
the images of the rear-view camera when reversing, for vehicles equipped with it;
any other information, of various types.

SUMMARY OF THE INVENTION

The technical aim of the present invention is to improve the state of the art in the field of safety equipment for velocipedes, mopeds, motorcycles and all other types of vehicles, both those of new manufacture and those already in circulation, in order to increase its active safety.

Within such technical aim, it is an object of the present invention to make available a safety device for vehicles that allows the driver to have a clear, complete and panoramic rear view on both sides, almost without taking his eyes off the forward direction of travel.

Another object of the present invention is to develop a safety device for vehicles that can be adopted immediately by the manufacturers, in compliance with the regulations of the individual countries, both for newly manufactured vehicles and for those already in circulation.

A further object of the present invention is to provide a safety device for vehicles which can be activated in a simple, easy and safe way, without risks for the driver.

Another object of the present invention is to provide a safety device for velocipedes consisting of an "aftermarket" product, or installable on newly manufactured velocipedes, which allows cyclists not to have to take a hand off the handlebar to manage the on-board computer information, to the benefit of active safety.

This aim and these objects are all achieved by the improved safety device for vehicles according to the present application.

The device comprises at least one video camera, which can be installed in a portion of the external rear surface of a vehicle, oriented so that its lens faces in the opposite direction to that of the advancement of the vehicle, or in the same direction in the event of a vehicle capable of proceeding in reverse.

The device also includes at least one processing unit, to which the camera is operatively connected.

The device also includes at least one display, operatively connected to the processing unit, suitable for viewing the images taken by the camera when the vehicle moves in travel direction.

The device also includes at least one control, operatively connected to the processing unit, which can be operated by the driver, and is capable of activating the camera, and therefore the rear-view function on the display.

Thanks to this solution, at any time while the vehicle is moving, the driver can see and check what is happening behind him without taking his eyes off the travel direction for a too long time period, and even in the event of being unable to use the normal rear view mirrors.

In greater detail, two main versions of the invention are proposed, one of which relating to newly manufactured vehicles, and the other relating to vehicles already in circulation, or in any case already manufactured.

In summary, the version relating to newly manufactured vehicles provides that a certain display, already provided in the vehicle (preferably the instrument panel display or the display already present inside the instrument panel), can operate in a first mode of use, or in a second use mode, distinct from each other: the switch from one mode to the other can be activated by means of a control (for example a manual control).

In the first mode of use of the display, the rear display function is not active, and the display behaves like a traditional display, showing normal vehicle information, graphics and/or images, etc.

In the second mode of use, however, the display is driven to visualize, in real time, the images taken by the camera, in other words the rear view function is activated, at the discretion of the driver: this rear view function is activated only for the time desired by the driver, just to avoid the risk of diverting attention from driving.

The version relating to vehicles already in circulation provides for the preparation and installation of a kit comprising, in its fundamental components, at least one camera, at least one processing unit, at least one rear view display and at least one control (for example a manual control), operationally connected to each other.

The peculiarity of this version is that the rear display is incorporated in a support that can be installed in vehicle, in place of at least one of the rear-view mirrors, or that can be installed inside the passenger compartment.

For example, in the case of a car, the support can be installed in place of the central mirror; in a motorcycle or a velocipede, the support can be installed in place of one of the external side mirrors.

In a truck, bus, and the like, the support can be installed inside the passenger compartment, since a central rear-view mirror is not normally provided in these vehicles.

The present application refers to preferred and advantageous embodiments of the invention.

BRIEF DESCRIPTION OF THE DRAWINGS

These and further advantages will be better understood by each person skilled in the art from the description that follows and from the attached drawings, given as a non-limiting example, in which:

FIG. 1 is a schematic rear view of a car on which the device according to the invention is installed;

FIG. 2 is a schematic rear view of a truck on which the device according to the invention is installed;

FIG. 3 is a schematic rear view of a bus on which the device according to the invention is installed;

FIG. 4 is a schematic rear view of a motor vehicle on which the device according to the invention is installed;

FIG. 14 is a detailed schematic front view of the front part of a motor vehicle, on which the device according to another embodiment of the invention is installed, and in which the rear display function is not active;

FIG. 15 is a detailed schematic front view of the instrument panel of the motor vehicle of FIG. 14, in which the rear display function is active;

FIG. 16 is a schematic top view of the front of another motor vehicle, on which the device according to the invention is installed, and with the rear-view mirrors in the open configuration;

FIG. 17 is a schematic top view of the motor vehicle of FIG. 16, with the rear-view mirrors in the closed or inactive configuration;

FIG. 21 is a schematic perspective view of the device display support, according to another embodiment, in a configuration of use;

FIG. 22 is a schematic side view of the support of FIG. 21;

FIG. 23 is a schematic perspective view of the support of FIG. 21, in another configuration of use;

DETAILED DESCRIPTION OF THE INVENTION

Figure 5:
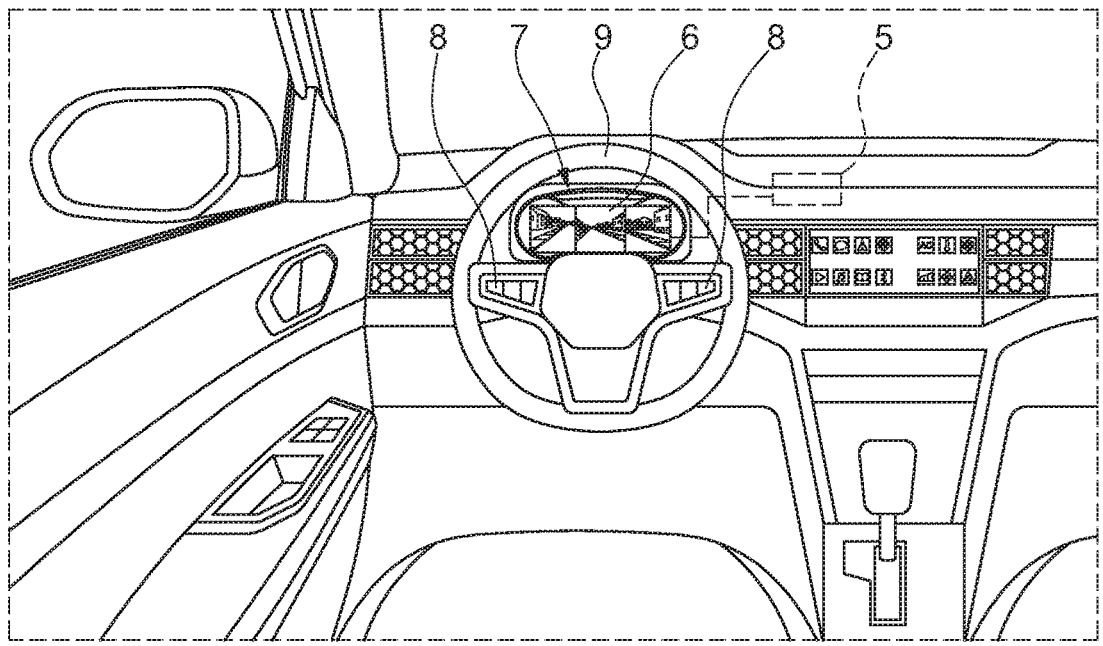
FIG. 5 is a schematic view of the dashboard of a car on which the device according to the invention is installed.

With reference to FIG. 1, an improved safety device for vehicles, according to the present invention, is wholly indicated with 1.

FIG. 1 shows a vehicle V consisting of a car; the vehicle V could however be of any other type, for example a truck (FIG. 2), a bus (FIG. 3), a motor vehicle (FIG. 4), or other, without particular limitations for the objects of the present invention.

Within the present invention, a device 1 with specifically devised features has been developed for each type of vehicle V.

The device 1 comprises at least one camera 2, or a plurality of cameras 2a, 2b, 2c.

Camera 2, or each of cameras 2a, 2b, 2c, can be of any type suitable for the application: for example, it can be a mini-camera.

The video camera 2, or each of the video cameras 2a, 2b, 2c, can be installed in a portion of the external rear surface 3 of the vehicle V, oriented so that its lens is turned substantially in the opposite direction to that of the advancement of the vehicle V itself.

In other words, the camera 2, or each of the cameras 2a, 2b, 2c, is oriented so that its lens captures the surrounding environment behind the vehicle V, with reference to the direction of normal forward travel.

In two-wheeled V vehicles (velocipedes, motor vehicles) the device 1 preferably comprises a single camera 2, installed in the rear area of the V vehicle itself.

For example, the only camera 2 can be installed under the saddle of vehicle V.

In the other types of V vehicles (cars, trucks, buses, etc.), device 1 comprises one or more cameras 2a, 2b, 2c.

More in detail, in some embodiments of the invention of particular practical interest, the device 1 comprises at least three cameras 2a, 2b, 2c, or even a higher number of cameras.

The aforementioned three cameras 2a, 2b, 2c comprise a central camera 2a, and two side cameras 2b, 2c.

The central camera 2a can be installed in the rear area of the vehicle V, preferably in the center, and preferably in a position from which the shots are optimal: for example, it can be positioned at the top of the rear area, as shown in FIGS. 1-3, or possibly even lower, in the area of the plate holder.

The central camera 2a can have a tilt and zoom function, so as to give a more panoramic and remote view when the vehicle V drives forward, and a more narrow and downward view directed towards the road while the vehicle is reversing.

The side cameras 2b, 2c are preferably installable in positions that allow the driver to have a rear view as similar as possible and comparable to that which is obtained by observing traditional side rear-view mirrors.

For this reason, the side cameras 2b, 2c, in an embodiment of the invention of particularly practical interest, can be installed in the vehicle bodywork V under the two external side rear view mirrors 4.

This could allow, in the future, the complete elimination of the exterior rear-view mirrors in case of modification of the rules of the highway code.

Furthermore, the side cameras 2b, 2c do not interfere with the driver's direct side view.

However, in other embodiments of the invention, the side cameras 2b, 2c of the device 1 could be provided in other areas of the external rear surface 3 of the vehicle V, according to certain design/application requirements.

The side cameras 2b, 2c can be adjustable in position, like the current mirrors, with manual or electric devices to optimize the vision on the sides according to the height, and according to driver's needs; the side cameras 2b, 2c could also automatically position themselves downwards, when reverse gear is engaged.

Device 1 also includes at least one processing unit 5.

The processing unit 5 is schematically shown in a discontinuous section, and for the sole purpose of better understanding, in FIG. 5.

The only camera 2, or the plurality of cameras 2a, 2b, 2c, is operationally connected, and enslaved, to the processing unit 5.

The processing unit 5 can be the same already present in the vehicle V (for example, the control unit of the vehicle V, or a specific unit of the control unit), or it can be an autonomous unit, assigned only to manage the device 1 according to the invention.

The device 1 also comprises at least one display 6.

Display 6 is operationally connected to the processing unit 5.

The display 6 is suitable to visualize the images taken by the single camera 2, or by the plurality of cameras 2a, 2b, 2c.

More specifically, according to the invention, display 6 is suitable to visualize the images taken by the single camera 2, or by the plurality of cameras 2a, 2b, 2c, when the vehicle V moves in the travel direction.

In this way the driver, at any time as the vehicle V advances, can observe and control what is happening behind him For example—but not only—the driver can observe and detect the movements of the vehicles that follow him, to avoid, in turn, from carrying out actions or movements that could put himself and/or other vehicles in a situation of potential danger.

According to an aspect of the present invention, display 6 is positioned, in the vehicle V, so that the driver can observe it quickly and effectively without taking his eyes off the travel direction for too long.

In an embodiment of the invention, which refers in particular to newly manufactured vehicles V (see for example FIG. 5), display 6 is positioned inside the instrument panel 7 of the vehicle V, in a front position with respect to the driving position.

According to a possible and advantageous positioning, the display 6 is provided in the center of the instrument panel 7; in this position, the display 6 can be immediately observed by the driver of the vehicle V, by simply lowering his gaze slightly from the travel direction, even for a few seconds.

The dimensions of the display 6 are such as to allow the driver to have a clear, crisp and complete vision, compatibly with the space available inside the instrument panel 7.

Evidently, V vehicles equipped with wide instrument panels 7 benefit from this point of view.

Furthermore, as better described below, inside the instrument panel 7 the display 6 is as large as possible, precisely for the needs of clear, clear and complete vision of the driver while driving.

According to an aspect of the invention, therefore, the display 6 is a display already supplied with the vehicle V; therefore, there is no need to set up another special display.

According to another aspect of the invention, the device 1 comprises a control 8.

Control 8 is operationally connected to processing unit 5.

The control 8 can be operated by the driver at his own discretion, and it is suitable for activating the camera 2 (or the plurality of cameras 2a, 2b, 2c), and therefore the rear view function, in real time, on the display 6.

In this embodiment of the invention, the control 8 is suitable to selectively modify, at the discretion of the driver of the vehicle V, the mode of use of the display 6 from a first mode, in which the rear display function is not active, to a second mode, in which the rear view function is active, and vice versa.

This control 8 is configured to selectively change, at the discretion of the driver of the vehicle, the mode of use of the display from a first mode, in which the rear view function is not active, to a second mode, in which the rear display function is active, and vice versa, and in which the first mode of use of the display functions as a traditional display, i.e., it shows the normal information relating to the vehicle, and possibly also graphics and/or images, and in which, in the second mode of use, the display is driven to display, in real time, the images taken by the camera.

The display 6 is a display already supplied with current vehicles, and it preferably consists of the display of the instrument panel of the vehicle positioned frontally with respect to the driver; the display is able to selectively display the images taken by the camera when the vehicle moves in the forward or reverse direction, occupying only part of the display of the instrument panel or its entire surface, to have a larger image.

In other words, in the first mode of use, the display 6 functions like a traditional display, that is, it shows the normal information relating to the vehicle, and possibly also graphics and/or images, if it is set up to operate in this way (for example, images or graphics of the navigator, of the radio, or even images or graphics that simulate analog instruments, etc.).

In the second mode of use, however, the display 6 is driven to visualize, in real time, the images taken by the only camera 2, or by the plurality of cameras 2a, 2b, 2c.

This means that the driver, only when he wishes, can decide to instantly change the way the display 6 is used to activate the rear view generated by the cameras 2,2a, 2b, 2c.

The control 8 can be of the manually operated type; the control 8 can be constituted, for example, by a button, a lever, a knob, or the like.

Control 8, if it is of the manually operated type, is preferably provided in an area of the vehicle V, or of the passenger compartment of the vehicle V, easily and quickly accessible for the driver.

For example, in the case of a vehicle V consisting of a car, or a truck, or a bus, the control 8 can comprise (or consist of) a button (or lever, or knob) located on the steering wheel 9, for example on the spokes of the steering wheel 9 (FIG. 5), or also on the inside of the wheel of the steering wheel, or near it.

Thanks to this solution, the driver can change the way the display 6 is used quickly and easily, even without taking his eyes off the guide, that is, the travel direction.

In a typical situation, described only as a non-limiting example, if the driver wishes to overtake, or a lane change, he can then operate the control 8 to activate, even if only for a few moments, the rear view, so as to verify that no vehicles arrive and that there is sufficient space and the necessary safety conditions.

The control 8 can be configured so as to allow the modification of the operating mode (in particular the modification from the first mode to the second mode, in which the rear view is active) only when the driver works actively on it: for example, in the event that the control 8 consists of a button, this means that the rear display is activated only when the driver keeps the aforesaid button pressed (and therefore deactivates when the button is released). Or, control 8 can be configured so as to allow modification of the operating mode (from first to second, and vice versa) with a simple press or touch.

For example, if the control 8 consists of a button, this means that a simple and instantaneous pressing of this button causes the passage from the first mode of use to the second mode of use, while a further instantaneous pressing of the button brings the display 6 again in the first mode of use.

In this configuration, therefore, the driver can keep the rear-view function active for as long as he wishes, without having to keep the button on the control 8 pressed.

It may also possibly be provided that the driver can choose/set the configuration of use of the control 8 he prefers (simple pressure, maintained pressure, etc.).

As shown in FIG. 5, the device 1 can also comprise several actuation controls 8, to make the driver's gestures easier (for example, two identical and symmetrical buttons on the steering wheel 9 in the case of a vehicle consisting of a car, truck, bus, etc.).

In other embodiments of the invention, the actuation control 8 can also be of a non-manual type.

For example, in some embodiments the control 8 could be of the vocal type, or of another type, without limitations for the purposes of the present invention.

Figure 6:
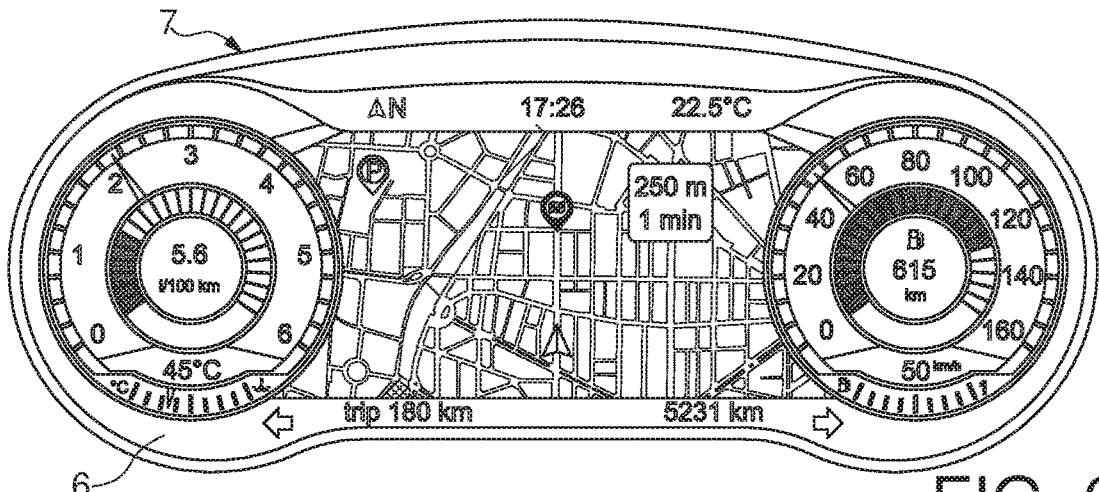
FIG. 6 is a schematic front view of the instrument panel of the car of FIG. 5, in which the rear display function is not active.
Figure 7:
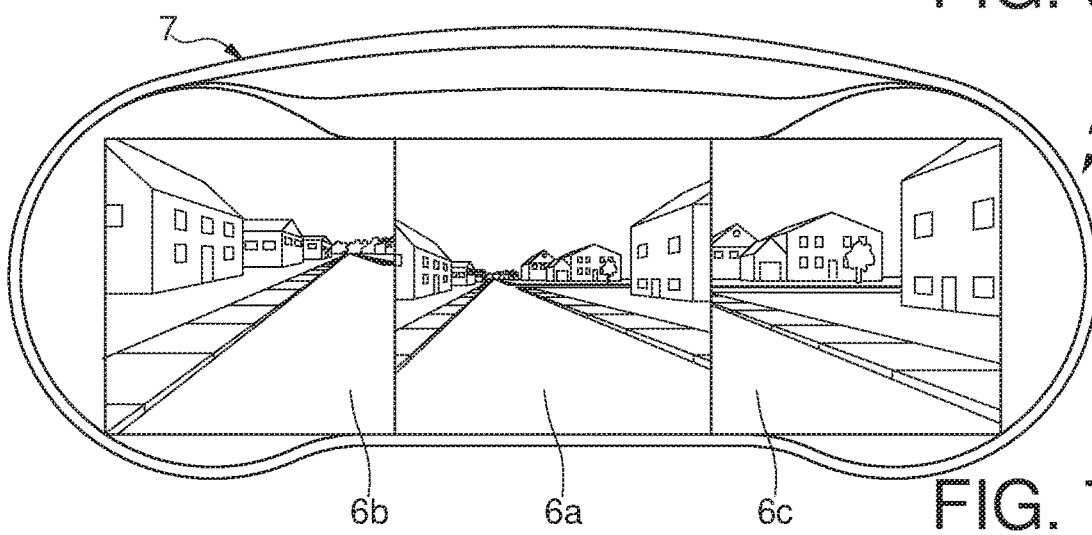
FIG. 7 is a schematic front view of the same instrument panel of FIG. 6, in which the rear display function is active.

The embodiment of the invention illustrated in detail in FIGS. 6,7 refers, in particular, to a vehicle V of the type of cars, trucks, buses, etc., comprising an instrument panel 7 entirely consisting of a single display 6 (for example of the LCD type or the like), which in the first mode of use (FIG. 6) shows, on the full screen, parameters and information relating to the vehicle, as well as graphics and images (images of the navigator, and/or emulation of analog instruments, and/or other).

In the second mode of use (FIG. 7), activated by control 8, the display 6 allows to visualize the rear images taken by the cameras 2a, 2b, 2c.

In particular, in this second mode of use, the display 6 comprises three rear display portions 6a, 6b, 6c side by side, i.e. a central portion 6a and two side portions 6b, 6c, which respectively show, in real time, the images taken from the three cameras 2a, 2b, 2c.

Since, as mentioned, the instrument panel 7 is entirely made up of a single display 6, the three rear display portions 6a, 6b, 6c can have an overall surface that substantially corresponds to the entire surface of the display 6 (possibly, a less than small differences due to the shape of the instrument panel 7 itself).

This solution is certainly to be preferred as it allows obtaining the rear view with the maximum surface extension, obviously in relation to the useful dimensions of the instrument panel 7.

Figure 8:
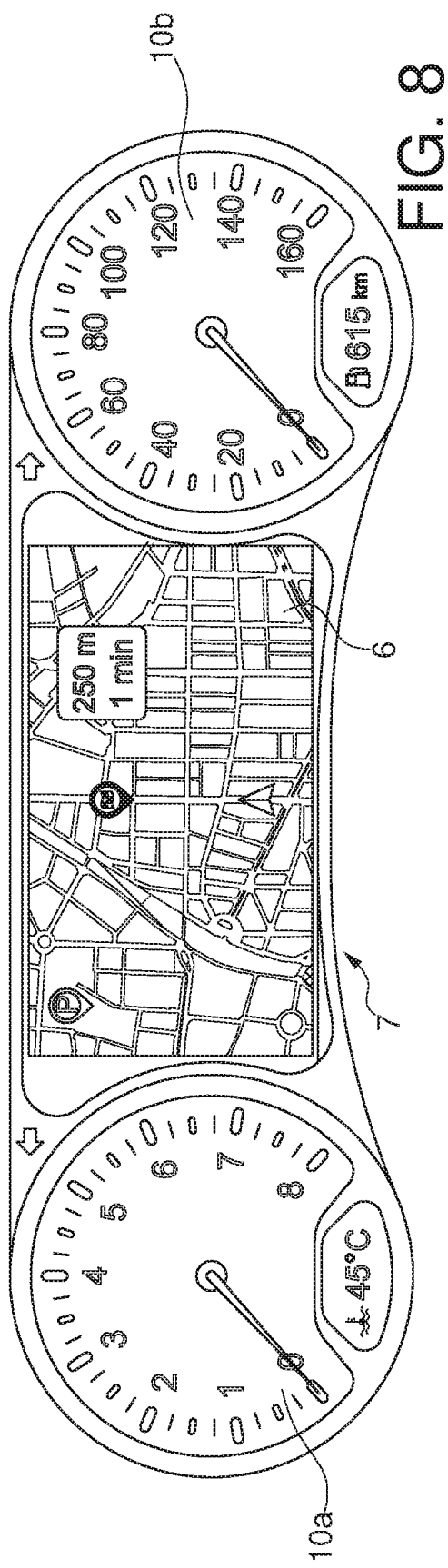
FIG. 8 is a schematic front view of the instrument panel of the car according to another embodiment of the invention, in which the rear display function is not active.
Figure 9:
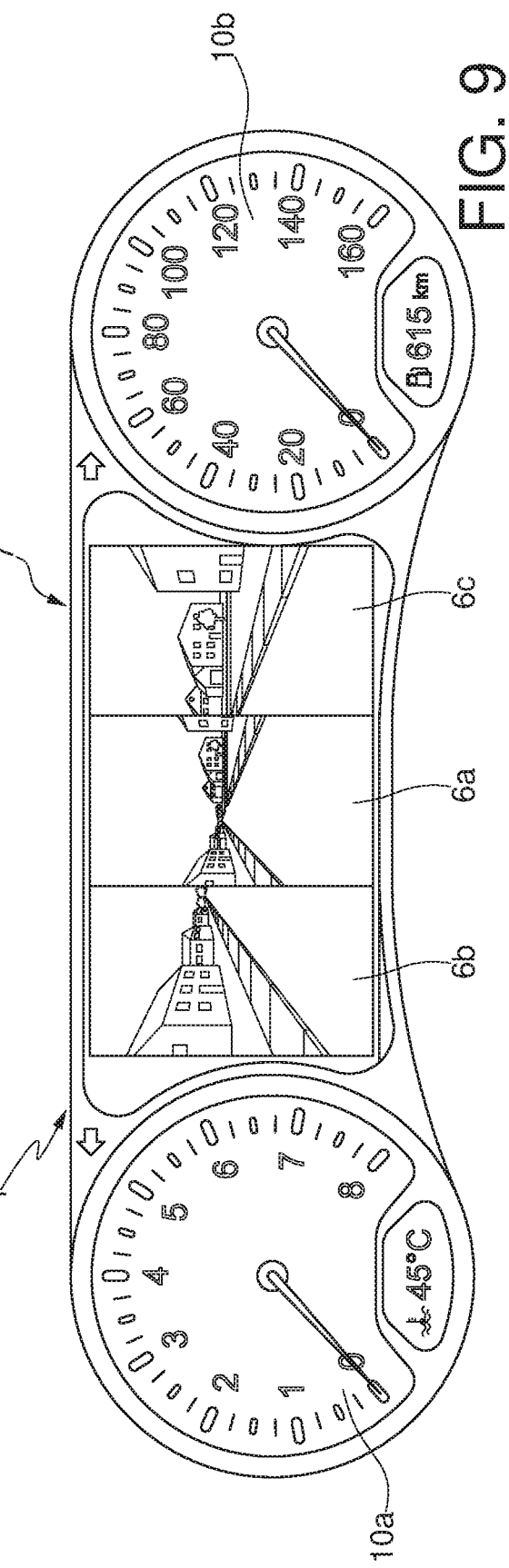
FIG. 9 is a schematic front view of the same instrument panel of FIG. 6, in which the rear display function is active.

The embodiment of the invention illustrated in detail in FIGS. 8,9 refers, instead, to a vehicle V of the type of cars, trucks, buses, etc. equipped with a more traditional instrument panel 7, comprising at least one analog instrument 10a, 10b.

For example, the embodiment of FIGS. 8,9 includes, more particularly, two analog instruments 10a, 10b (typically a speedometer and a tachometer, but not exclusively), among which at least one display 6 is included.

The aforementioned display 6, in the first mode of use (FIG. 8), shows parameters and information relating to the vehicle, and/or graphics and images (images of the navigator, and/or simulation of analog instruments, and/or other).

Here too, in the second mode of use (FIG. 9), which can be activated by control 8, the display 6 allows visualizing, in real time, the rear images taken by the cameras 2a, 2b, 2c.

Also in this case, the display 6 comprises three rear display portions 6a, 6b, 6c side by side, i.e. a central portion 6a and two lateral portions 6b, 6c.

This solution is therefore indicated in situations in which the vehicle V is intended to be equipped with an instrument panel 7 equipped with analog instruments 10a, 10b.

Figure 10:
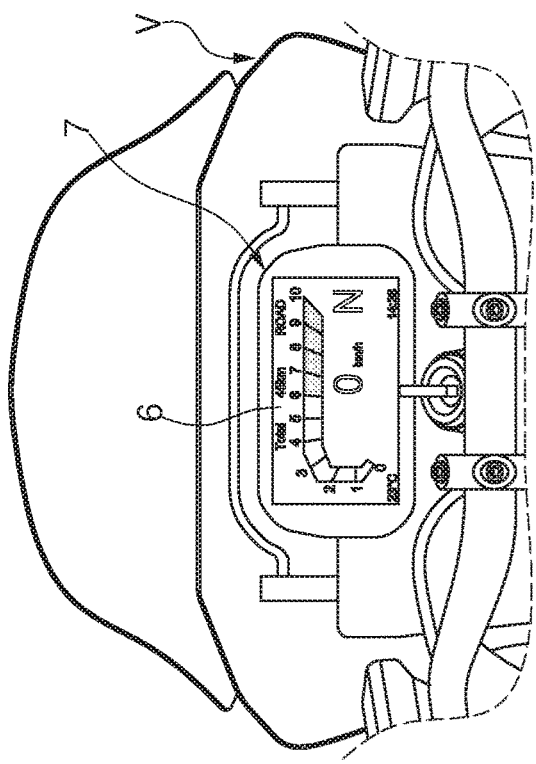
FIG. 10 is a detailed schematic front view of the front part of a motor vehicle on which the device according to the invention is installed, and in which the rear display function is not active.
Figure 11:
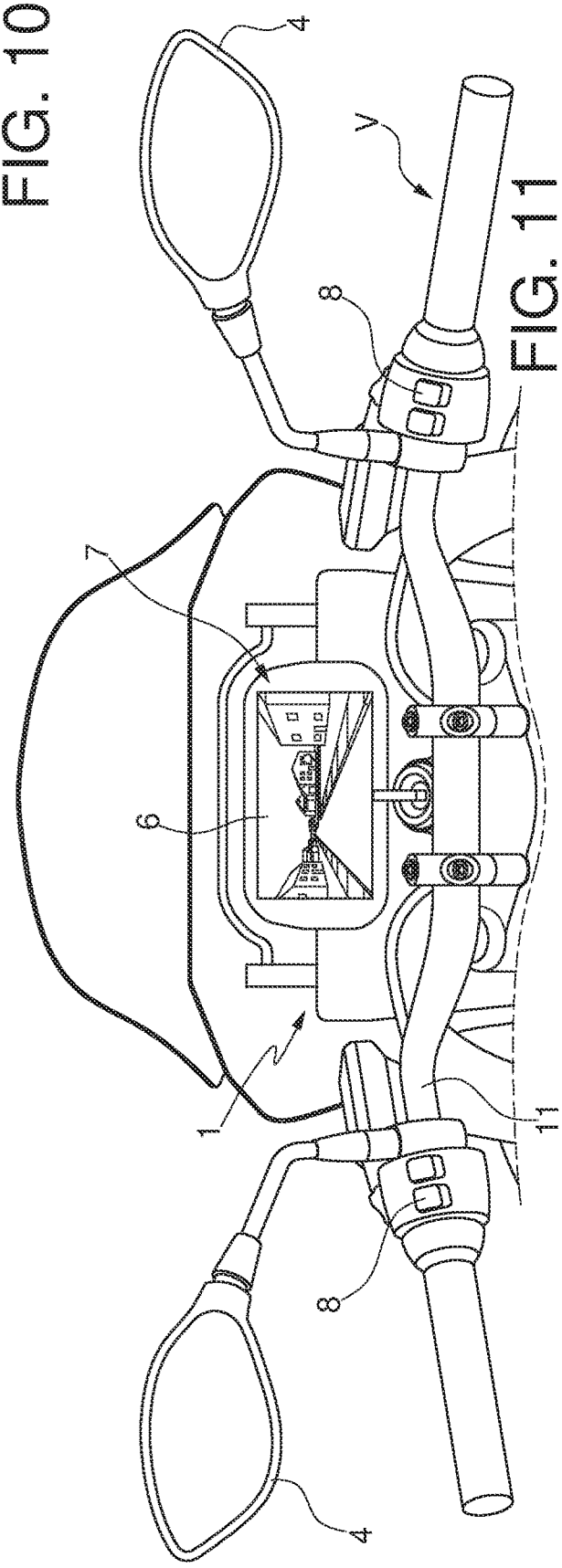
FIG. 11 is a detailed schematic front view of the instrument panel of the motor vehicle of FIG. 10, in which the rear display function is active.

The embodiment of the invention illustrated in FIGS. 10, 11 refers to a device 1 installed on a motor vehicle V.

In particular, it is a motor vehicle in which the instrument panel 7 is entirely made up of a single display 6 (similarly to the embodiment of FIGS. 6, 7).

In this case (and also with reference to FIG. 4) the device 1 comprises, as mentioned, a single camera 2; consequently, display 6 also includes a single rear display portion (which therefore may have a surface substantially corresponding to that of the entire display 6).

In more detail, FIG. 10 refers to the first mode of use of the display 6, in which the latter works in the traditional way showing data, parameters, graphics relating to the vehicle.

FIG. 11 refers, instead, to the second mode of use of display 6, in which the latter shows, in real time and in full screen, the images taken by the only camera 2.

The control 8, in this embodiment of the device 1, can comprise (or consist of) at least one button, associated with the handlebar 11 of the motor vehicle V.

Then the driver, while driving, in case he wants to activate the rear display function, activates the control 8 (for example, by pressing the button on the handlebar 11), and thus determines the passage of the display 6 from the first use mode (FIG. 10) to the second mode of use (FIG. 11).

Also in this embodiment, the configuration of the control 8 can be of the active drive type (i.e. the second mode of use is active only as long as the control 8 is actually activated) or with a drive determined by a single touch to activate/deactivate the second mode of use.

As can be understood, among the technical advantages of the device 1 according to the invention there is also—in theory, and if desired—the possibility of completely renouncing the use of the side rear-view mirrors 4.

As a consequence of this, the vehicle V which incorporates the device 1 according to the invention can be equipped with side mirrors 4 with variable configuration, in particular foldable mirrors.

Figure 12:
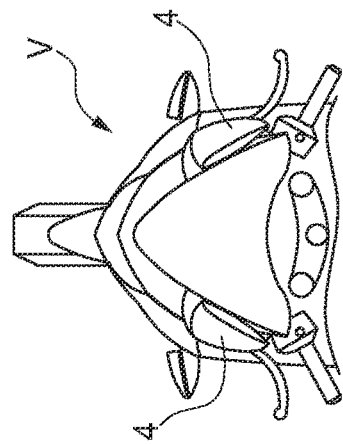
FIG. 12 is a schematic top view of the front of a motor vehicle on which the device according to the invention is installed, and with the rear-view mirrors in the open configuration.
Figure 13:
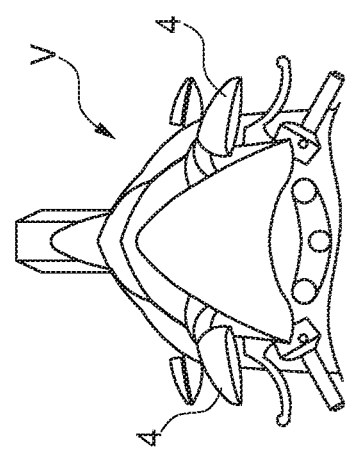
FIG. 13 is a schematic top view of the motor vehicle of FIG. 12, with the rear-view mirrors in the closed configuration.

As shown schematically in FIGS. 12, 13, therefore, the motor vehicle V can comprise side rear-view mirrors 4 which can pass from the normal open use configuration (FIG. 12) to a closed configuration (FIG. 13), in which they are not used, since rear vision is guaranteed by device 1.

The latter configuration also improves the aerodynamic performance of vehicle V.

Also, the embodiment of the invention shown in FIGS. 14, 15 refers to a device 1 installed on a motor vehicle V (of a different type from that of the embodiment of FIGS. 10, 11).

In this case, it is a motor vehicle V in which the instrument panel 7 comprises at least one analog instrument 10a, 10b; in more detail, this instrument panel 7 comprises two analog instruments 10a, 10b (typically a speedometer and a tachometer) between which at least one display 6 is included.

In this embodiment too, the device 1 comprises a single rear view camera 2; consequently, the display 6 also includes a single rear display portion (which therefore may have a surface substantially corresponding to that of the entire display 6 itself).

In more detail, FIG. 14 refers to the first mode of use of the display 6, in which the latter works in the traditional way showing data, parameters, graphics relating to the vehicle.

FIG. 15 refers, however, to the second mode of use of the display 6, in which the latter shows, in real time, the images taken by the only camera 2, thus allowing the visualization of the rear view of the motor vehicle V.

In this embodiment too, the control 8 can comprise (or consist of) at least one button, associated with the handlebar 11 of the motor vehicle V.

The same considerations expressed with regard to the embodiment of FIGS. 10, 11 apply; in particular, also in this embodiment, the motor vehicle V can be provided with side mirrors 4 with variable configuration.

More in detail, in this embodiment the side rear-view mirrors 4 can be movable from a normal configuration of use (FIG. 16), to a configuration of minimum aerodynamic resistance (FIG. 17), in which they are—for example—rotated in a way to be arranged substantially parallel to the horizontal plane.

Figure 20:
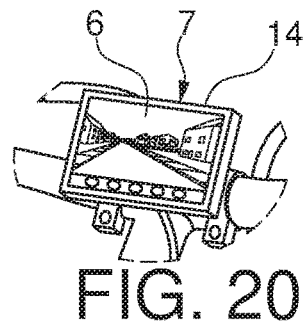
FIG. 20 is a detailed perspective view of the display of the velocipede of FIG. 18, in which the rear display function is active.
Figure 18:
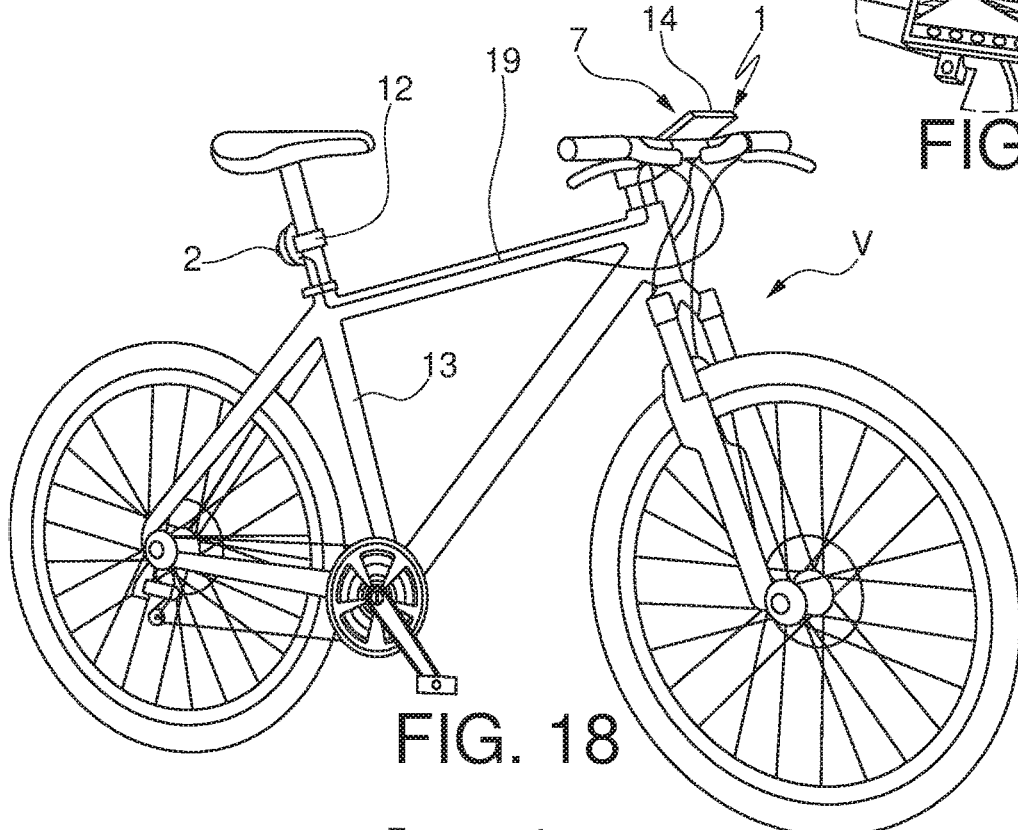
FIG. 18 is a perspective view of a velocipede on which the safety device according to the invention is installed.
Figure 19:
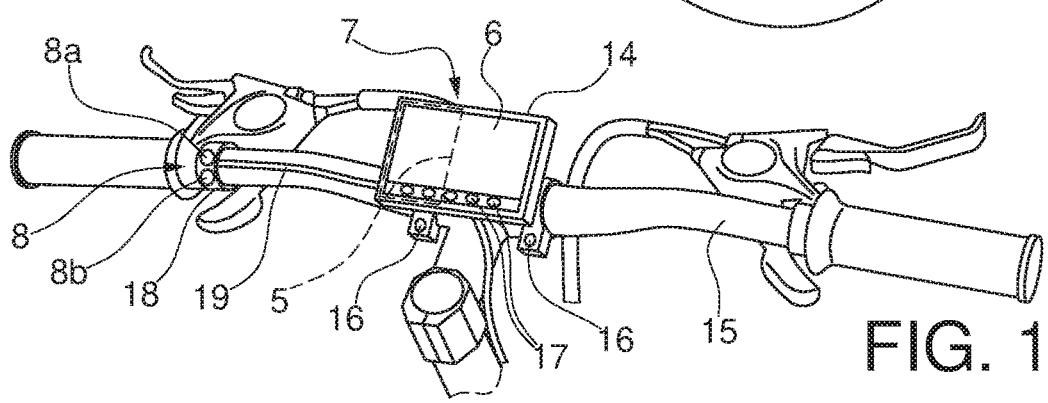
FIG. 19 is a detailed perspective view of the front part of the velocipede of FIG. 18, and in which in the display the rear-view function is not active.

In the embodiment of the invention of FIGS. 18-20, the vehicle V comprising the device 1 consists of a velocipede, or bicycle.

This embodiment can be indicated for newly manufactured velocipeds V; however, the entire device 1 can consist of a complete kit that can be installed on any velocipede V.

More specifically, the camera 2 can be associated with a respective bracket 12, or other equivalent support element, which can be fixed to the rear part of the frame 13 of the velocipede V.

In this embodiment, the device 1 can comprise an instrument panel 7 which comprises a box-like element 14, which can be fixed to the handlebar 15 of the velocipede V.

The box-like element 14 can be fixed to the handlebar 15 by means of clamps 16, which can be of any suitable type.

The processing unit 5 is housed inside the box-like element 14; in addition, the box-like element 14 houses the display 6.

The box-like element 14 can comprise buttons 17 for controlling the display 6 display functions, in particular in its first mode of use.

The control 8 comprises a fixing element 18 to the handlebar 15 of the velocipede V.

The fastening element 18 can be constituted, for example, by a ring, a clamp, or the like.

The control 8 can comprise a first button or a lever 8a, suitable for activating/deactivating the second mode of use of the display 6, associated with the fixing element 18.

Furthermore, the control 8 can comprise a second button 8b, for controlling the display functions of the display 6 in its first mode of use.

The second button 8b is also integrated in the same fixing element 18.

In more detail, the second button 8b allows the cyclist to select the various information to be viewed sequentially, without taking his hands off the handlebar 15.

In this way, the information can be displayed clearly and at a larger size (even occupying the entire screen) and driving safety is not jeopardized.

Figure 19A:
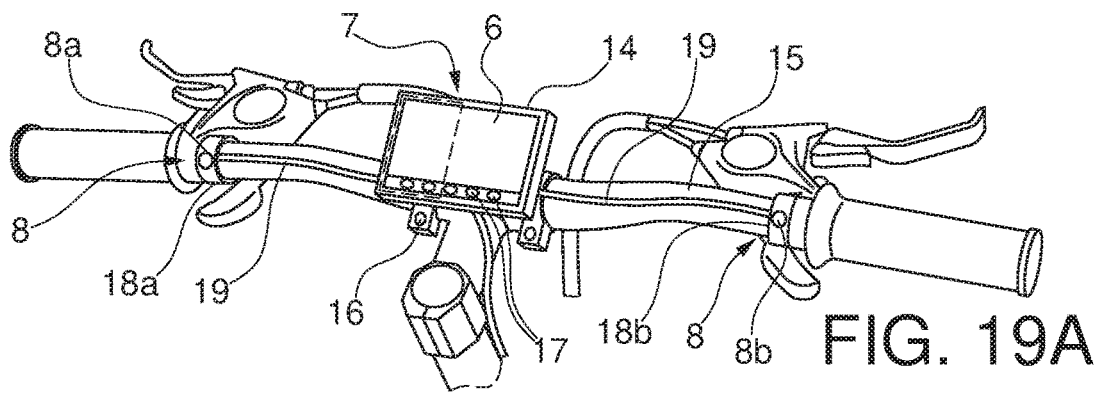
FIG. 19A is a detailed perspective view of the front of the velocipede of FIG. 19, and in which the rear display function is not active in the display, in another embodiment of the invention.

In another embodiment of the invention, shown in FIG. 19A, the first button 8a and the second button 8b are associated respectively with a first fixing element 18a and a second fixing element 18b, provided near the two opposite handles of the handlebar 15.

With this solution, the cyclist can, with one hand (via the first button 8a) control the transition from the first mode to the second mode of use of the display 6, and vice versa; he can also, with the other hand (via the second button 8b), select the information to be displayed sequentially, forward or backward.

Thanks to these solutions, in particular, the cyclist can avoid pressing the control buttons 17 on the display, to view different information.

The various components of the device 1—in particular the box-like element 14, the camera 2 and the control 8—can be connected by cables 19 fixed along various parts of the frame 13, or of the handlebar 15.

FIG. 19 refers to the first mode of use of the display 6, in which the latter works in the traditional way showing data, parameters, graphics relating to the vehicle.

FIG. 20 refers, however, to the second mode of use of the display 6, in which the latter shows, in real time, the images taken by the only camera 2, thus allowing the view of the rear panorama to the velocipede V.

Also in this embodiment, the configuration of the control 8 can be of the active drive type (i.e. the second mode of use is active only as long as the control 8 is actually activated) or with a drive determined by a single touch to activate/deactivate the second mode of use.

In another version of the present invention, which concern in particular vehicles already in circulation, provision is made for the preparation and installation of a complete kit in which the rear view display 6 is incorporated in a support 20 which can be installed in the vehicle V, instead of at least one of the rear-view mirrors, or can be installed inside the passenger compartment of vehicle V.

As part of this version of the invention, FIGS. 21-27 refer to specific embodiments in which the device 1 comprises a support 20 with which the display 6 is associated; this support 20 also includes at least one mirror 21, which can be used as a rear-view mirror.

According to this aspect of the invention, the display 6 and the mirror 21 can be used alternatively one to the other: in particular, the mirror 21 can be used in case of failure of the display 6, or of the camera 2, or of other parts of the device 1.

More in detail, the support 20 comprises an element 22 having a first surface 23, in which the display 6 is provided.

The element 22 also comprises a second surface 24, opposed to the first surface 23, in which the rear-view mirror 21 is provided.

In particular, FIGS. 21-23 concern an embodiment of the invention in which the support 20 can be installed inside the passenger compartment of a vehicle V, such as a car, a truck, a bus, etc., in place of the normal central rear view mirror.

In more detail, the support 20 can replace the normal central rear view mirror in vehicles V (typically cars) in which it is present; in vehicles V where, instead, it is not normally present (for example trucks, buses, etc.) the support 20 could be installed from scratch.

When viewed from the front, and also from the side—see for example FIG. 22—the element 22 of the support 20 essentially has the same dimensions as a normal central rear-view mirror for the passenger compartment of cars, or the like.

It is therefore not necessary to make changes inside the passenger compartment, apart from replacing the traditional rear-view mirror with the support 20 according to the present invention.

The support 20 also comprises a connecting portion 25 of the element 22 to fixed parts of the vehicle V; in more detail, the connecting portion 25 is suitable to constrain the element 22, for example, to the roof of the passenger compartment of the vehicle V.

The connections 25a of the display 6 to the processing unit 5 can pass through the connection portion 25, if provided.

According to another aspect of the invention, the support 20 comprises a rotating joint 26, which connects the element 22 to the connecting portion 25.

The rotary joint 26 allows to manually rotate the element 22 with respect to the connecting portion 25, in such a way as to selectively orient the first surface 23, or the second surface 24, towards the driver.

Typically, and in normal conditions of use, the driver orients the first surface 23, comprising the display 6, so that it can be observed during the forward movement of the vehicle V.

In the event that the driver does not intend to monitor the rear area of the vehicle V via the display 6, or, above all, in the event of failure of some component of the device 1 (for example of the same display 6, or of one of the cameras 2a, 2b, 2c) the driver can manually rotate the element 22 around the rotating joint 26, so as to orient the second surface 24 towards itself, comprising the rear-view mirror 21.

In this way, even in case of failure of the device 1 or some of its components, the driver can continue to monitor the rear area, albeit with the traditional view of the rear-view mirror.

Also in this embodiment, the display 6 comprises three rear display portions 6a, 6b, 6c side by side, i.e. a central portion 6a and two lateral portions 6b, 6c, which display the images taken, respectively, by the central camera 2a and from side cameras 2b, 2c of vehicle V.

Differently from what previously described, in this embodiment the control 8 is configured to selectively activate or deactivate the rear display function in the support 20, since the display 6 is solely assigned to this function.

Figure 24:
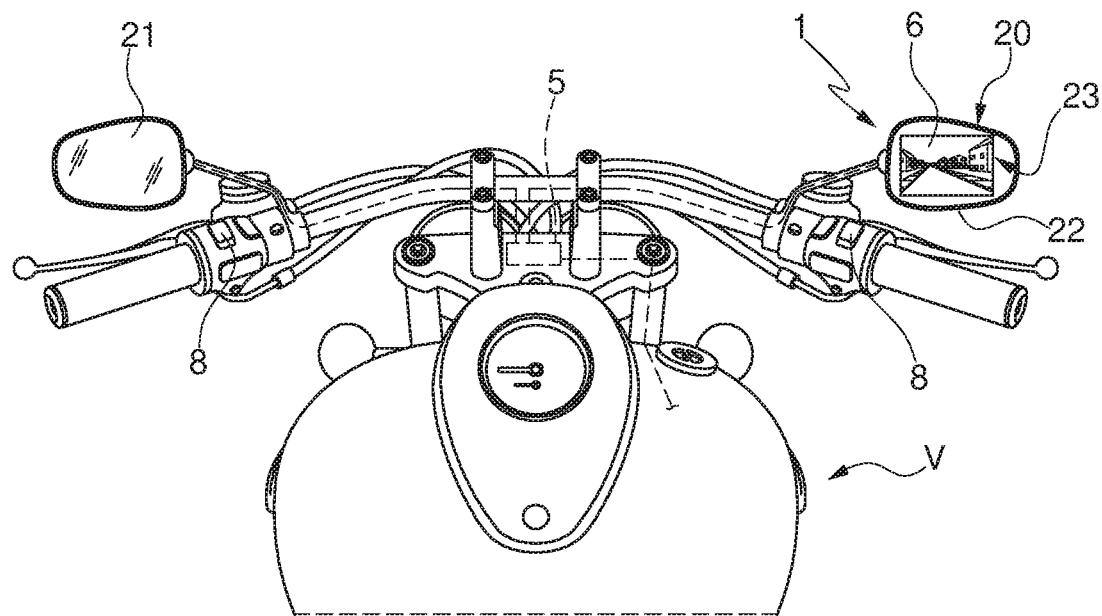
FIG. 24 is a perspective view of the front of a motor vehicle, on which the device is installed, according to another embodiment of the invention.
Figure 25:
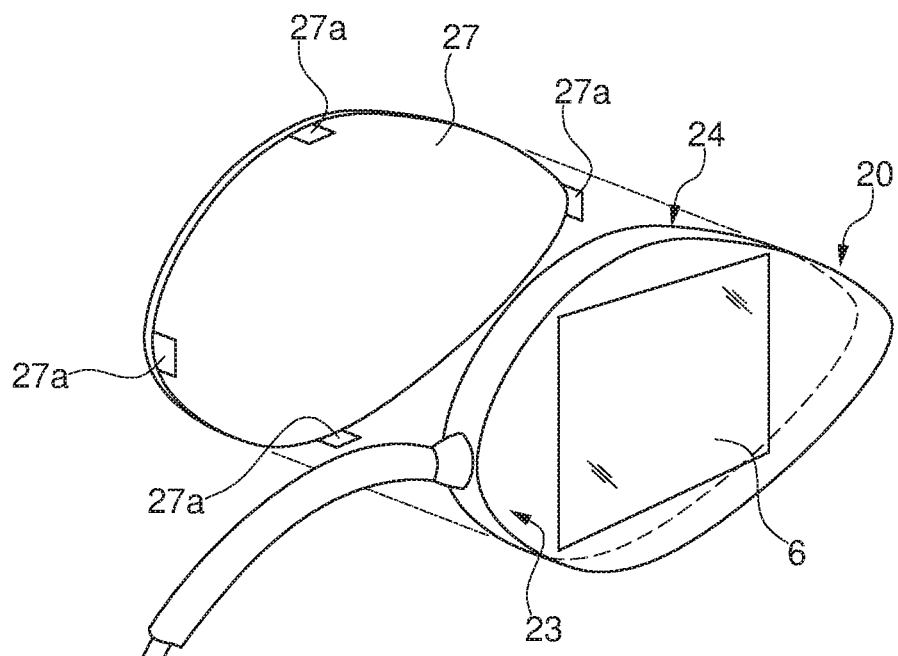
FIG. 25 is a schematic view of the display support of the device, according to the embodiment of FIG. 24.

FIGS. 24, 25 schematically represent another embodiment of the invention, with features similar to those of the embodiment of FIGS. 21-23, in which the vehicle V consists of a motorcycle, a moped, or the like.

In this embodiment too, the vehicle V comprises, in place of at least one of the traditional rear-view mirrors 21 (in particular at least the right one), at least one support 20 having features similar to those described with regard to the embodiment of FIGS. 21-23.

With regard to the specific features of the device 1 in this embodiment, and in particular to the features of the support 20, reference is made to what is described with regard to the embodiment of FIGS. 21-23.

However, this embodiment of the invention includes a further feature, namely the fact that the support 20 includes at least one protection 27 for one or the other of the surfaces 23,24 of the element 22.

More in detail, since the support 20, while the vehicle V is traveling, is directly exposed to the air and atmospheric agents, the surface 23,24 which is oriented forward can become dirty, wet or damaged.

For this reason, in any condition, the one among the surfaces 23,24 that is not used can be effectively protected, so as to present itself immediately in optimal conditions when its use is necessary.

The protection 27 can therefore be removed (fixed for example by interlocking portions 27a or other similar fixing means) so that it can be easily assembled or disassembled in case of need, at one or the other of the surfaces 23, 24.

In this case too, the control 8 is configured to selectively activate or deactivate the rear display function in the display 6 of the support 20.

Figure 26:
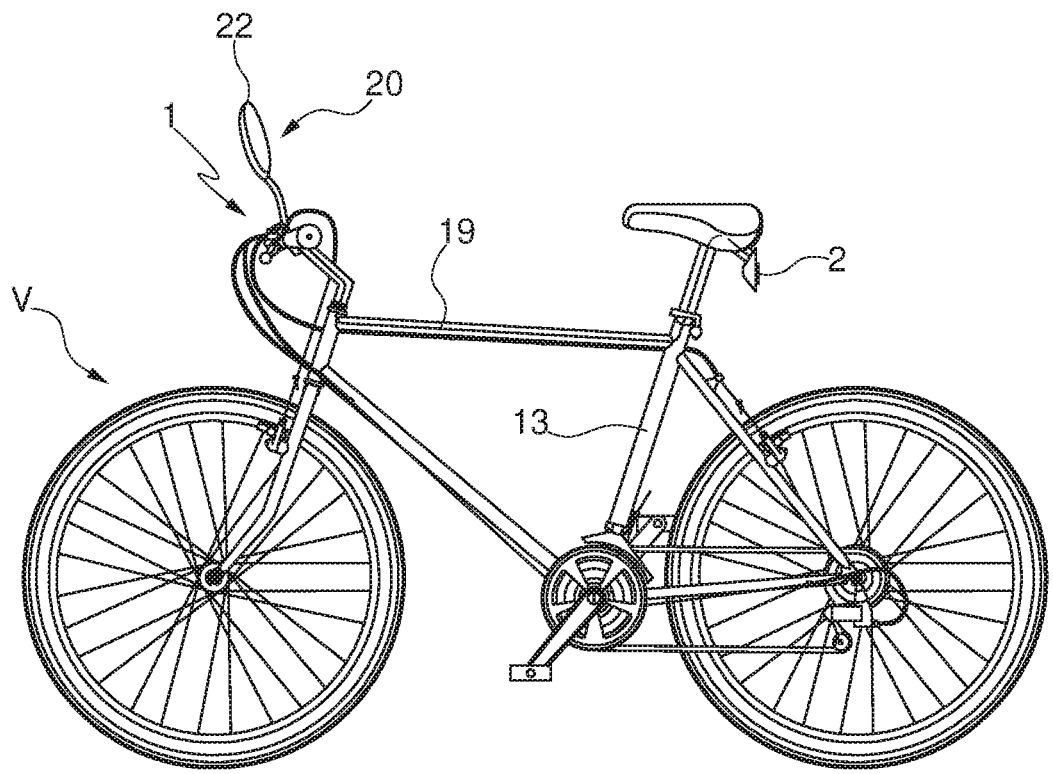
FIG. 26 is a side view of a velocipede, on which the device according to the invention is installed, in another embodiment.
Figure 27:
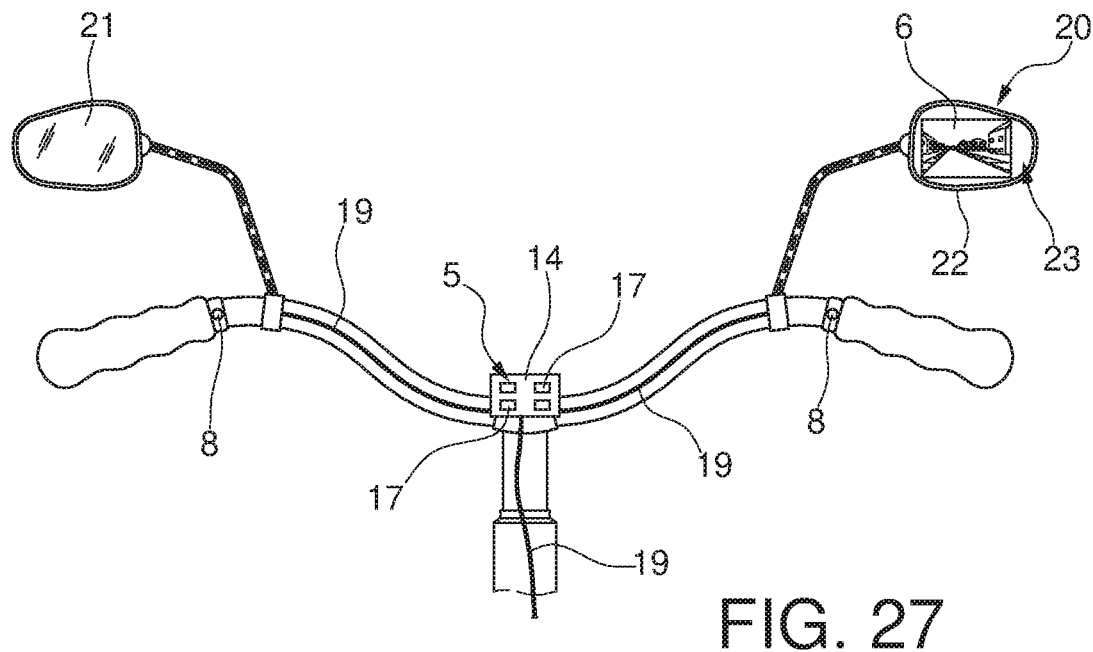
FIG. 27 is a detailed perspective view of the front part of the velocipede of FIG. 26.

The embodiment of FIGS. 26, 27 is similar to that of FIGS. 24, 25, and it differs in that the vehicle V is constituted, here, by a velocipede.

In this embodiment, the device 1 can comprise a box-like element 14, to which all the components of the device 1 are operatively connected (for example, by means of cables 19).

The box-like element 14 also houses the processing unit 5; the same box-like element 14 can also comprise push-buttons 17 for the main operation/control operations of the device 1.

The box-like element 14 can be fixed, for example, to the handlebar 15 of the velocipede V, in the most convenient and best accessible position.

In this case too, as regards the actuation of the device 1, the control 8 is configured to selectively activate or deactivate the rear display function in the support 20, at driver's discretion.

In all the embodiments previously described, the display 6 can be of any known type, and suitable for this type of application.

For example, the display 6 can be of the LCD type, with limited overall dimensions especially as regards the thickness; this allows its assembly on even very thin and light supports, which do not, for example, modify the features of the instrument panel 7 of vehicle V.

It is specified that, in all the previously described embodiments, all the connections between the components of the wired device 1 can be replaced by wireless connections.

The operation of the device 1 according to the invention is, in the light of what has been described, completely intuitive.

The images taken by camera 2, or by cameras 2a, 2b, 2c, may undergo any treatments and/or processing (carried out by the processing unit 5) before being sent to the display 6; for example, in the case of use with low visibility (low light, or fog, etc.) the images taken by camera 2 may undergo changes/processing (for example for characteristics such as brightness, contrast, or others) in order to be better visible for the driver.

Camera 2, or cameras 2a, 2b, 2c, can also be used to facilitate reverse operations, as already happens in some vehicles; in this case, the images taken can be sent—as already happens—to the central display provided on the vehicle's dashboard.

The present invention also concerns a vehicle V comprising a safety device 1 having the features previously described.

In particular, the present invention concerns a vehicle V consisting of a car, a truck, a bus, a motorcycle, a moped, a velocipede, a bicycle, or others, comprising the device 1 according to the present invention.

The invention thus conceived allows to achieve important technical advantages.

As clarified, the main advantage of the device 1 according to the present invention is constituted by the clear, sharp and complete rear vision during the forward movement of the vehicle V, especially in the case in which the use of traditional rear-view mirrors is hindered or made difficult for some reason (for example, for the presence of passengers or bulky luggage on vehicle V).

Another advantage consists in the fact that the actuation of the device 1, to activate the rear display function in a given instant, is carried out through a very simple and easy control 8 (for example, but not exclusively, manual), which allows the driver not to take his eyes off the travel direction.

Another advantage consists in the fact that the device 1 can be easily integrated/incorporated into elements or components already provided in the vehicle V; we refer in particular to the embodiments of FIGS. 21-27, in which the support 20 of the device 1 itself completely replaces at least one of the traditional rear-view mirrors, and does not entail further additional dimensions.

These advantages are obtained with simple and inexpensive construction solutions, which do not entail substantial modifications to the vehicles on which the device 1 is installed.

In all the embodiments of the invention illustrated above, or in others which are also possible, and in any case falling within the scope of the present invention, the device 1 allows the driver of the vehicle V to have a complete rear view both in normal forward and during the reverse operations, thus making the installation of the devices in use today—which are often supplied as an option—unnecessary for viewing the images of the rear view in a monitor during the reverse operations only.

Adopting the device 1 according to the present invention would also allow vehicle designers (for example cars) to design the bodywork of the rear part of the vehicle without the current constraints in the sizing of the rear pillars or of the rear window, to make it possible for the driver to view rear through the interior rear view mirror.

Among the most significant advantages are also the resolution of the problem of blind spots, or dead spots, the resolution of the problem of incorrect evaluation of the distances of the current side mirrors, and also the elimination of the central rear-view mirror, which also improves visibility front.

Thanks to the solutions according to the present invention, in order to have the rear view, the driver must take his eyes and attention away from the direction of travel of the vehicle for an extremely short period of time, since the images taken by the various cameras are displayed in a single display.

Furthermore, newly manufactured vehicles could be immediately equipped with the devices provided in the present invention, so as to be able to eliminate the side mirrors and the internal central mirror, with all the advantages already exposed, as soon as the legislation of each individual country allows it.

The external and internal mirrors could be prepared to be disassembled, and the fixing and passage holes of any cables could be closed with practical and special covers already supplied.

In addition, the exterior mirrors should have a good aerodynamic profile both in the open and closed position, so as to minimize aerodynamic resistance in the event that a first regulatory change may allow vehicles equipped with mini-cameras to proceed with the exterior mirrors closed and the internal one raised, to be repositioned only in case of malfunction of the display and/or mini-cameras.

The specific embodiment of the invention developed for velocipedes is of considerable benefit for driving safety, as the cyclist must never take his hands off the handlebar neither to obtain the rear view taken by the camera, nor to view sequentially the various information available on the display.

It has thus been seen how the invention achieves the proposed purposes.

The present invention has been described according to preferred embodiments, but equivalent variants can be conceived without departing from the scope of protection offered by the following claims.

The invention claimed is:

1. An improved safety device for vehicles, comprising:
   at least one video camera, with a tilt and zoom function, installed in a portion of the external rear surface of a vehicle, oriented so that a lens is facing a direction opposite to a direction of the vehicle advancement in a forward direction, or in a same direction of the vehicle when the vehicle is moving in a reverse direction, wherein the tilt and zoom function can be activated in either the forward or the reverse directions,
   at least one processing unit, to which said video camera is operatively connected, for sending acquired images taken by the at least one video camera, selectively and at a driver's request, to a preexisting display of the vehicle, said preexisting display comprising a display already existing in the vehicle for showing information and data relating to parameters and operations of the vehicle and operatively connected to said processing unit by at least one of wired or wireless connections,
   and at least one control, operatively connected to said at least one processing unit, operable by the driver for selectively activating said video camera and the rear-view function with respect to said preexisting display,
   wherein when the driver activates the at least one control, said at least one control is configured to modify a mode of use of said preexisting display from a first mode of use in which the rear view function is not active, to a second mode of use, in which the rear display function is active, and vice versa,
   wherein in said first mode of use, said preexisting display shows the information and data relating to the parameters and operations of the vehicle including at least one of graphics and images, and
   wherein in said second mode of use, said preexisting display displays in real time, the acquired images taken by said at least one video camera when the vehicle moves in the forward direction,
   wherein said control is manually operated, comprising at least a button, a lever or a knob, located on the steering wheel of the vehicle.

2. The device according to claim 1, comprising at least three cameras, of which a central camera is installed in the area rear of the vehicle, and two side cameras are installed in positions that provide the driver with a rear view.

3. The device according to claim 2, wherein said preexisting display comprises at least three rear display portions side by side including a central portion and two lateral portions, to show, in real time, images taken by these three cameras.

4. The device according to claim 1, installed in a newly manufactured vehicle.

5. The device according to claim 1, installed in a vehicle already in circulation or already manufactured.

6. The vehicle consisting of a car, a bus or a truck comprising at least one safety device according to claim 1.

7. An improved safety device for vehicles, comprising:
at least one video camera, with tilt and zoom function, installed in a portion of the external rear surface of a vehicle, oriented so that its lens is facing the direction opposite to that of vehicle advancement, or the same direction in case of reverse, during which the tilt and zoom function is activated,
at least one processing unit, to which said video camera is operatively connected, for sending acquired images taken by the at least one video camera, selectively and at driver's request, to a preexisting display of the vehicle, said preexisting display comprising a display already existing in the vehicle for showing information and data relating to parameters and operations of the vehicle and operatively connected to said processing unit by at least one of wired or wireless connections,
and at least one control, operatively connected to said processing unit, operable by the driver and suitable to selectively activate said video camera, and therefore the rear-view function with respect to said preexisting display,
wherein when the driver activates the at least one control, said at least one control modifies a mode of use of said preexisting display from a first mode in which the rear view function is not active, to a second mode, in which the rear display function is active, and vice versa,
wherein in said first mode of use, said preexisting display works like a traditional display showing the information and data relating to the parameters and operations of the vehicle including at least one of graphics and images, and
wherein in said second mode of use, said preexisting display displays in real time, the acquired images taken by said at least one video camera when the vehicle moves in the forward direction,
and wherein said control is of the vocal type.

8. An improved safety device for vehicles, comprising:
at least three video cameras, each with tilt and zoom function, installed in a portion of the external rear surface of a vehicle, oriented so that their lenses are facing the direction opposite to that of vehicle advancement, or the same direction in case of reverse, during which the tilt and zoom function is activated,
at least one processing unit, to which said video cameras are operatively connected, for sending acquired images, taken by the at least three video cameras, selectively and at driver's request, to a preexisting display of the vehicle, said preexisting display comprising a display already supplied in the vehicle for showing information and data relating to parameters and operations of the vehicle and operatively connected to said processing unit by at least one of wired or wireless connections,
and at least one control, operatively connected to said processing unit, operable by the driver and to selectively activate said video cameras, and therefore the rear-view function on the preexisting display,
wherein when the driver activates the at least one control, said at least one control modifies a mode of use of said preexisting display from a first mode in which the rear view function is not active, to a second mode, in which the rear display function is active, and vice versa,
wherein in said first mode of use, said preexisting display works like a traditional display, showing the information and data relating to the parameters and operations of the vehicle including at least one of graphics and images, and
wherein in said second mode of use, said preexisting display displays in real time, the acquired images taken by said cameras when the vehicle moves in the forward direction,
wherein said preexisting display comprises a display of an instrument panel of the vehicle positioned in front of the driver,
wherein said instrument panel entirely consists of said preexisting display,
wherein, in said second mode of use, said preexisting display comprises three rear display portions side by side, including a central portion and two side portions, which respectively show, in real time, the acquired images taken from said at least three video cameras,
wherein said control is of the manually operated type, comprising at least a button, a lever, a knob, located on the steering wheel of the vehicle, or of the vocal type.

9. The device according to claim 8, wherein said control consists of a button, such that a simple and instantaneous pressing of said button causes the passage from said first mode of use to said second mode of use, while a further instantaneous pressing of the button brings said preexisting display again in said first mode of use, so that in this configuration the driver can keep the rear-view function active for as long as he wishes, without having to keep the button on said control pressed.

* * * * *